(12) United States Patent
Dropps et al.

(10) Patent No.: US 7,525,968 B1
(45) Date of Patent: Apr. 28, 2009

(54) METHOD AND SYSTEM FOR AUTO ROUTING FIBRE CHANNEL CLASS F FRAMES IN A FIBRE CHANNEL FABRIC

(75) Inventors: Frank R. Dropps, Maple Grove, MN (US); Ernest G Kohlwey, Eagan, MN (US); Brel E. Indrelee, Edina, MN (US)

(73) Assignee: QLOGIC Corporation, Aliso Viejo, CA (US)

( * ) Notice: Subject to any disclaimer, the term of this patent is extended or adjusted under 35 U.S.C. 154(b) by 477 days.

(21) Appl. No.: 11/376,955

(22) Filed: Mar. 16, 2006

(51) Int. Cl.
*H04J 3/14* (2006.01)
*H04J 14/00* (2006.01)
*H04L 12/28* (2006.01)
*H04L 12/56* (2006.01)
*G06F 15/173* (2006.01)

(52) U.S. Cl. .................. 370/392; 370/231; 709/240
(58) Field of Classification Search ........... 370/229, 370/231, 389, 392; 709/238, 240
See application file for complete search history.

(56) References Cited

U.S. PATENT DOCUMENTS

| | | | | |
|---|---|---|---|---|
| 5,051,986 A | * | 9/1991 | Grow et al. | 370/455 |
| 5,805,924 A | * | 9/1998 | Stoevhase | 710/11 |
| 6,014,715 A | * | 1/2000 | Stoevhase | 710/11 |
| 7,042,842 B2 | * | 5/2006 | Paul et al. | 370/229 |
| 7,054,312 B2 | * | 5/2006 | Mitchem | 370/379 |
| 2005/0041812 A1 | * | 2/2005 | Sundararajan et al. | 380/256 |
| 2005/0047334 A1 | * | 3/2005 | Paul et al. | 370/229 |
| 2005/0063394 A1 | * | 3/2005 | Ko | 370/397 |
| 2007/0038679 A1 | * | 2/2007 | Ramkumar et al. | 707/200 |

* cited by examiner

*Primary Examiner*—Hassan Kizou
*Assistant Examiner*—Lonnie Sweet
(74) *Attorney, Agent, or Firm*—Klein, O'Neill & Singh, LLP

(57) ABSTRACT

Method and system for routing Fibre Channel Class F frames using a Fibre Channel switch element port is provided. The method includes parsing a Fibre Channel frame at a receive port of a Fibre Channel switch; and automatically routing a Class F frame that is destined to a Domain Controller. The switch element includes a receive port for parsing a Fibre Channel frame, storing a Domain Steering Table and automatically routing a Class F frame that is destined for a Domain Controller.

12 Claims, 14 Drawing Sheets

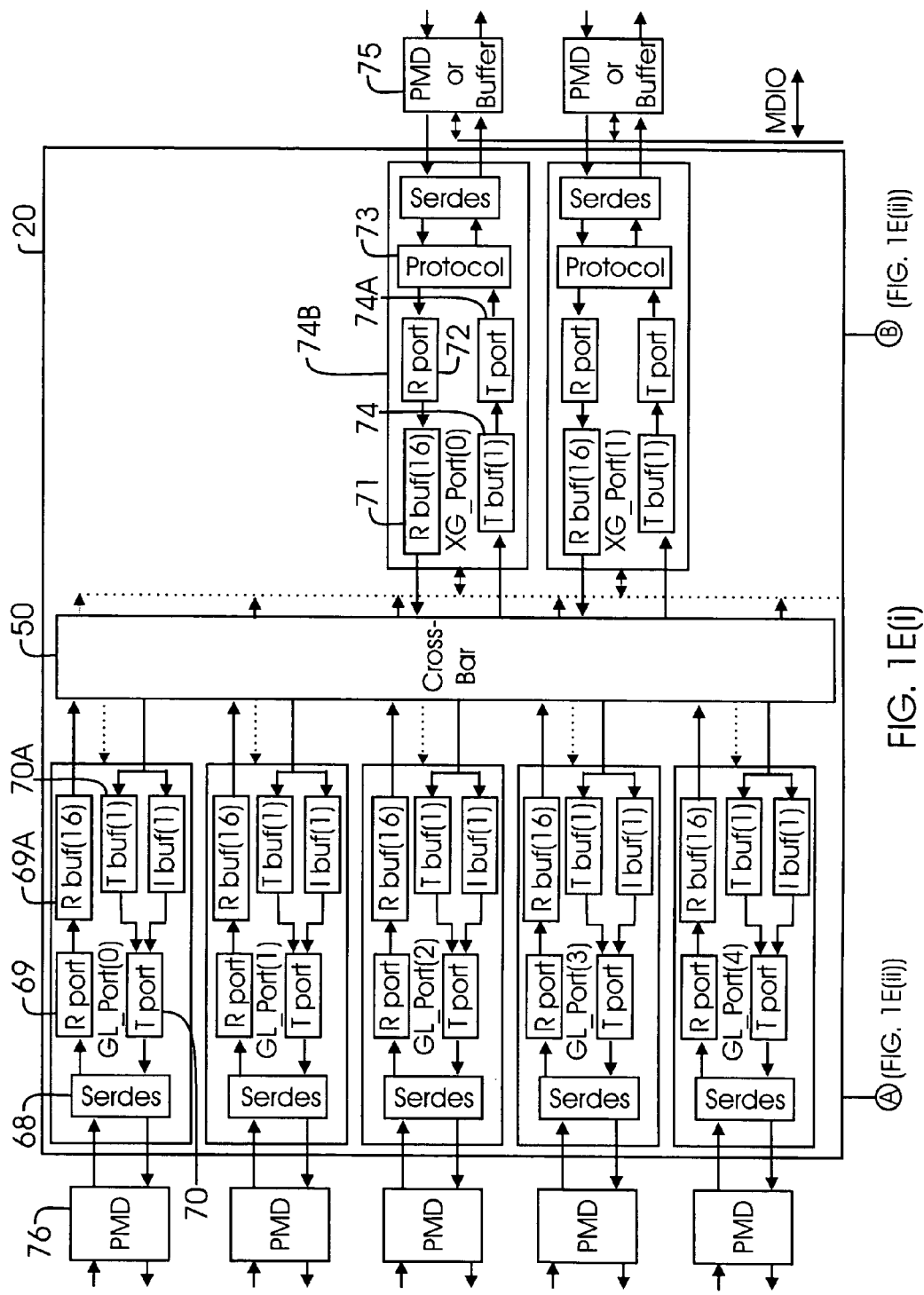

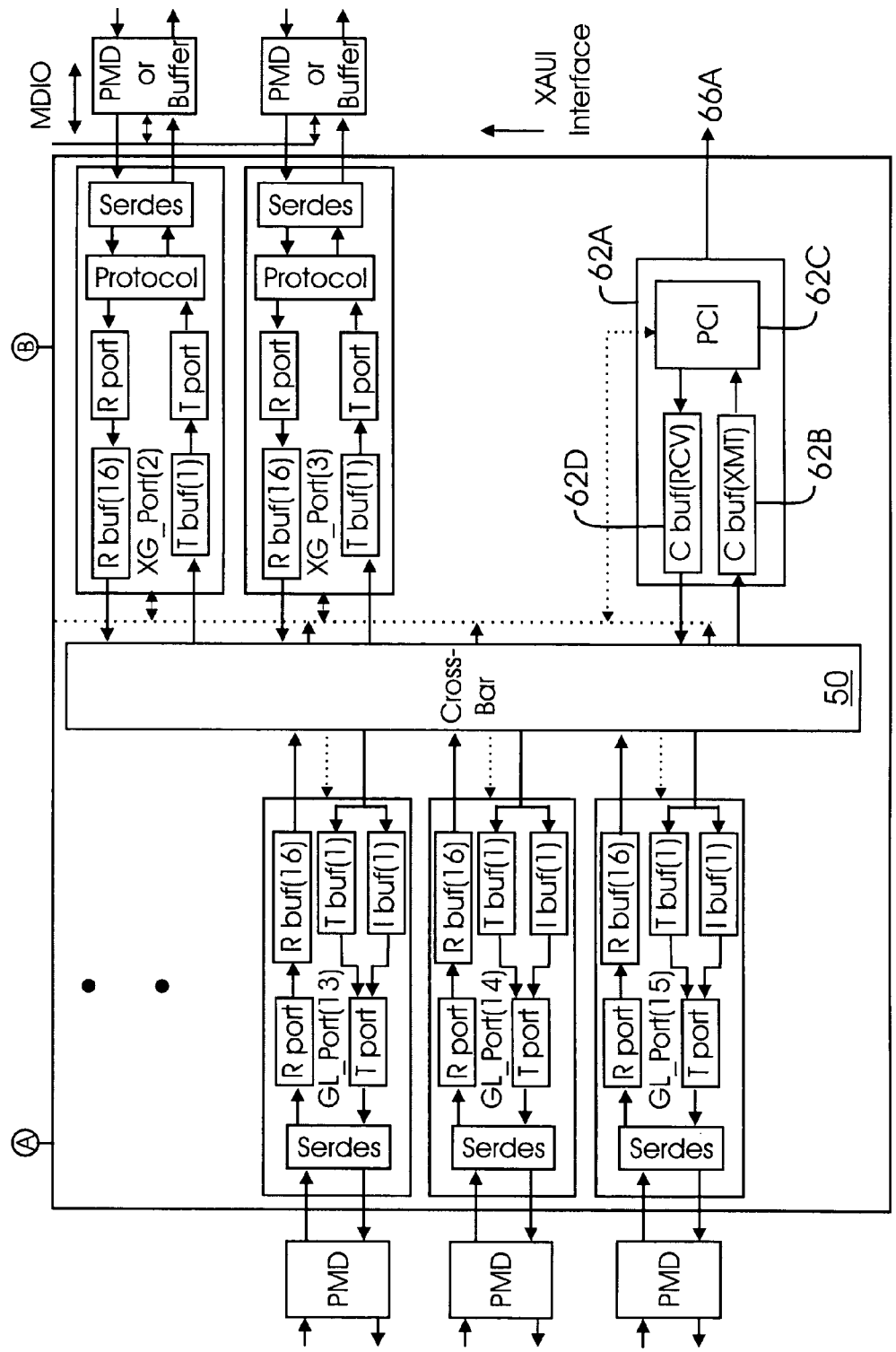
FIG. 1E(ii)

Domain Controller Addressing

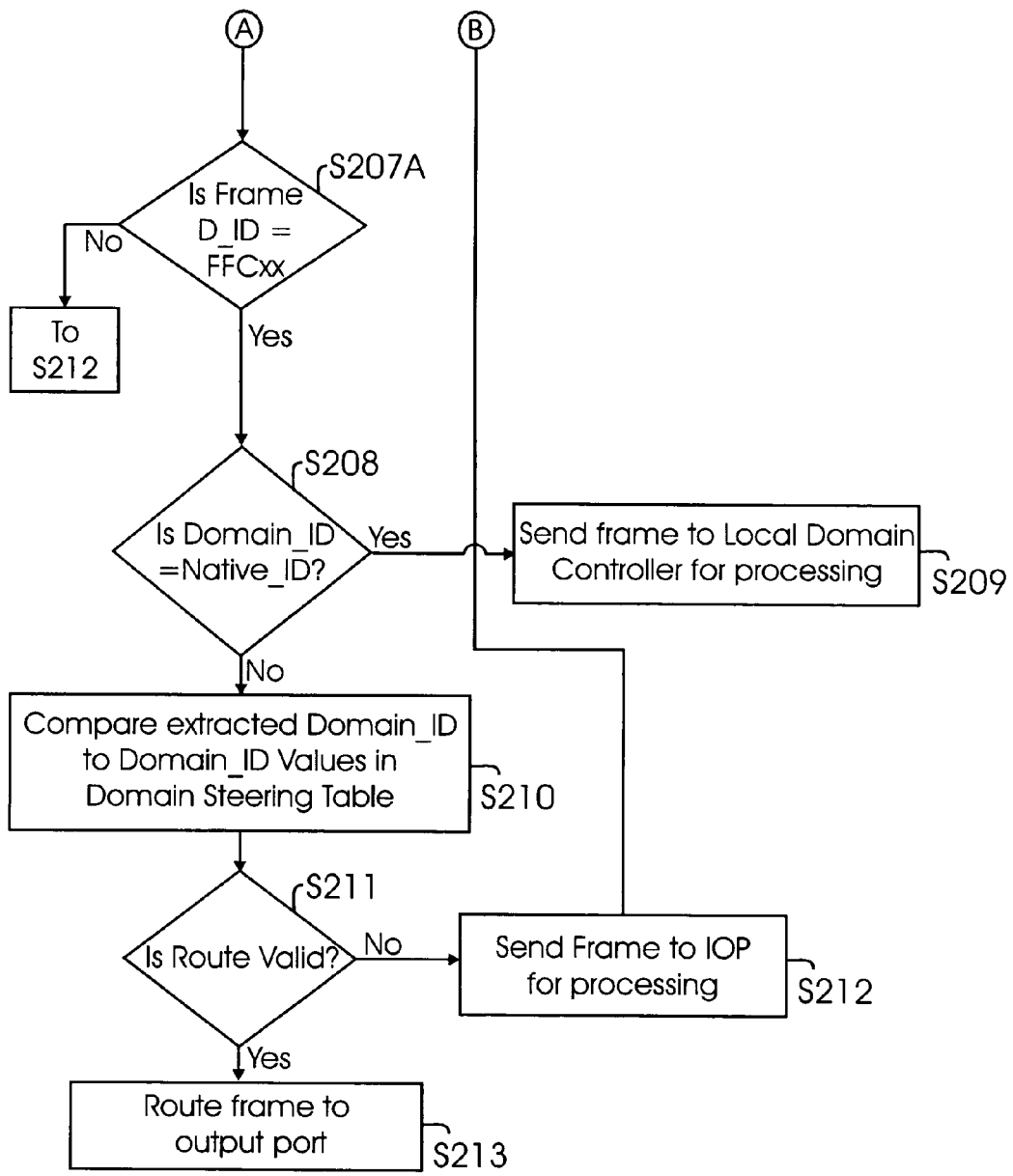

| Domain ID | Output Port Number | Route Valid |
|---|---|---|
| 0 | 1 | Yes |
| 1 | 4 | No |
| 2 | 8 | No |
| 3 | 5 | Yes |
| . | . | |
| . | . | |
| . | . | |
| N-1 | . | |
| N | 3 | Yes |

FIG. 3

METHOD AND SYSTEM FOR AUTO ROUTING FIBRE CHANNEL CLASS F FRAMES IN A FIBRE CHANNEL FABRIC

CROSS REFERENCE TO RELATED APPLICATIONS

Background

1. Field of the Invention

The present invention relates to Fibre Channel network systems, and more particularly, to routing Fibre Channel Class F frames.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel fabric devices include a node port or "N_Port" that manages fabric connections. The N_port establishes a connection to a fabric element (e.g., a switch) having a fabric port or "F_port".

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Fibre channel switch addressing is defined by Fibre Channel standards. Typically, a 24-bit identifier is used to uniquely identify a switch. The 24 bit address includes a 8-bit Domain Identification ("Domain_ID") number; 8-bit Area Identifier (Area_ID) and 8-bit Port Identifier (Port_ID), as stated in FC-SW_2 Section 4.8, incorporated herein by reference in its entirety.

Domain_ID identifies a domain of one or more switches that have the same Domain_ID for all N_Ports and NL_Ports (an N_Port that can perform an Arbitrated Loop function). A domain in the fibre channel environment as defined by ANSI Standard X3.289-199X Fibre Channel-Fabric Generic Requirements (FC-FG), incorporated herein by reference in its entirety, is the highest or most significant hierarchical level in a three-level addressing scheme. If there are more than one switch in a Domain, then each switch within the domain is directly connected via an inter-switch link ("ISL") to at least another switch in the domain.

Fibre Channel class F frames are used for communication between multiple switches in a Fibre Channel Fabric. Fibre Channel Class F frames are routed to a neighboring switch or to a non-neighboring switch in the Fibre Channel Fabric.

Typically, when a switch receives a Fibre Channel Class F Frame, a switch processor processes the frame. The switch processor executes instructions from a firmware stored as an image in a Random Access Memory (RAM). If the processor is busy performing switch operations or if the firmware image is reloaded when frames are received, then the received Fibre Channel Class F frames are backed up resulting in performance degradation. Therefore, there is a need for a method and system to optimize routing of Fibre Channel Class F frames with minimum use of the processor.

SUMMARY OF THE INVENTION

In one aspect of the present invention, a method for routing Fibre Channel Class F frames using a Fibre Channel switch element port is provided. The method includes parsing a Fibre Channel frame at a receive port of a Fibre Channel switch; and automatically routing a Class F frame that is destined to a Domain Controller.

In another aspect of the present invention, a Fibre Channel switch element for routing Fibre Channel Class F frames is provided. The switch element includes a receive port for parsing a Fibre Channel frame, storing a Domain Steering Table and automatically routing a Class F frame that is destined for a Domain Controller.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

Figure 1A:
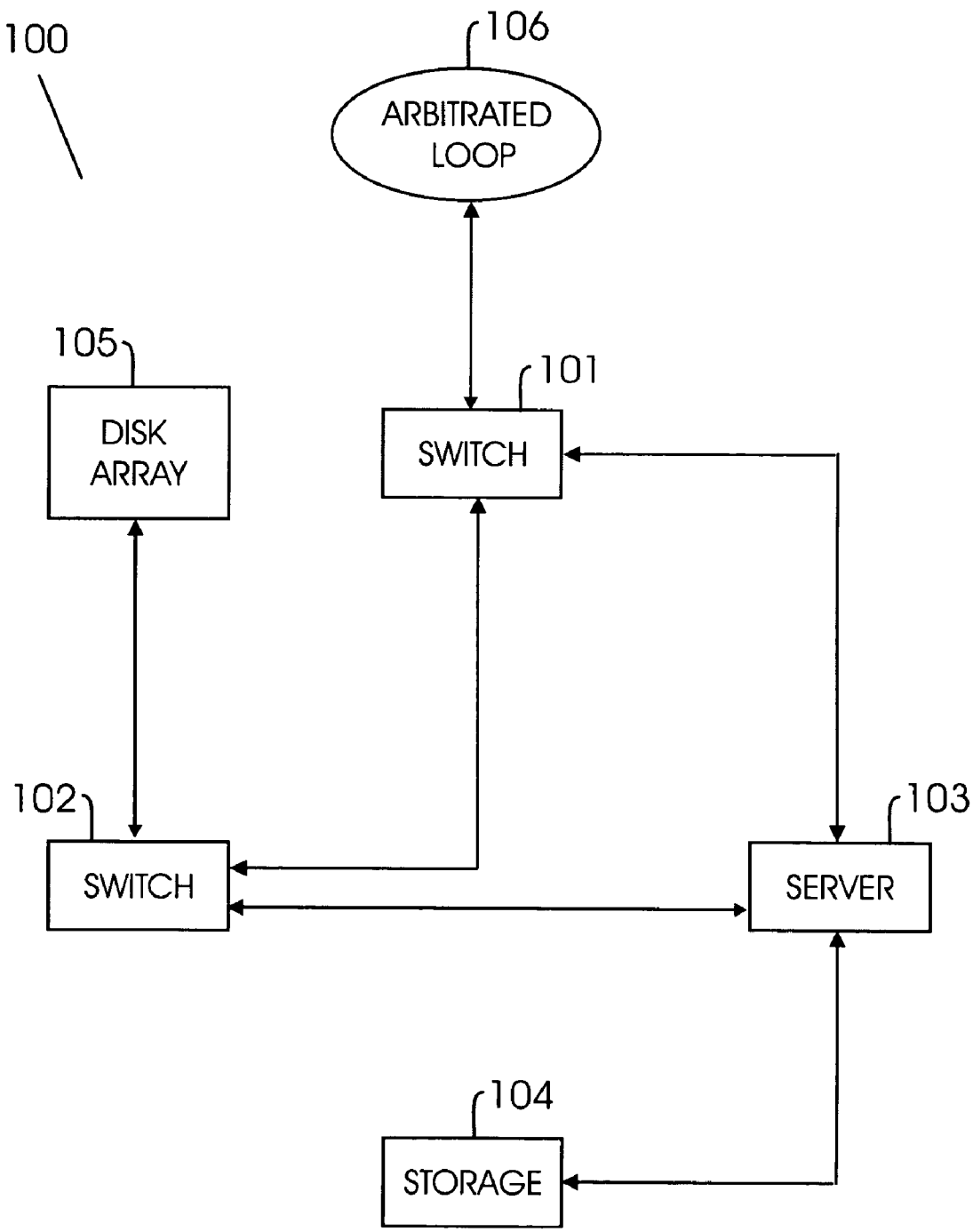
FIG. 1A shows an example of a network system used according to one aspect of the present invention.
Figure 1B:
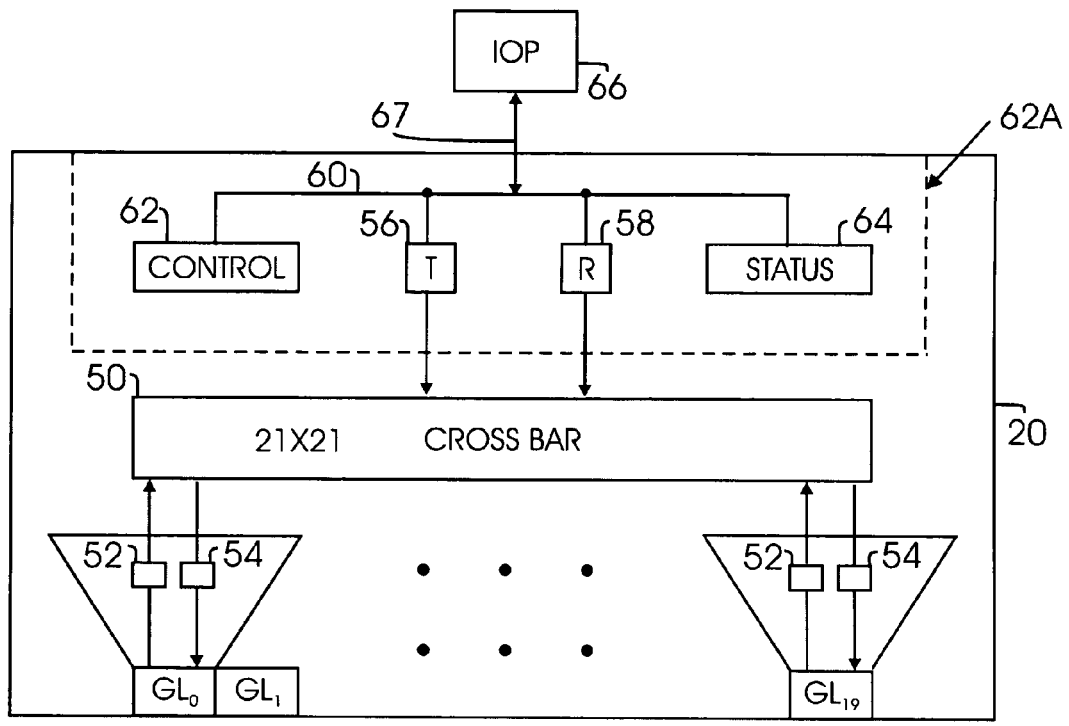
FIG. 1B shows an example of a Fibre Channel switch element, according to one aspect of the present invention.
Figure 1C:
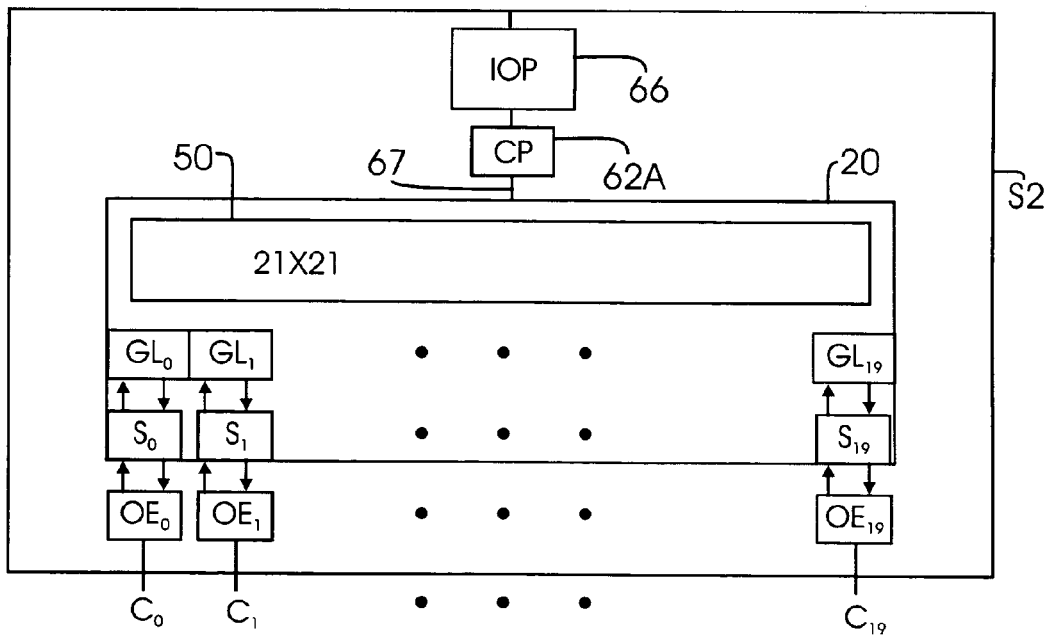
FIG. 1C shows a block diagram of a 20-channel switch chassis, according to one aspect of the present invention.
Figure 1D:
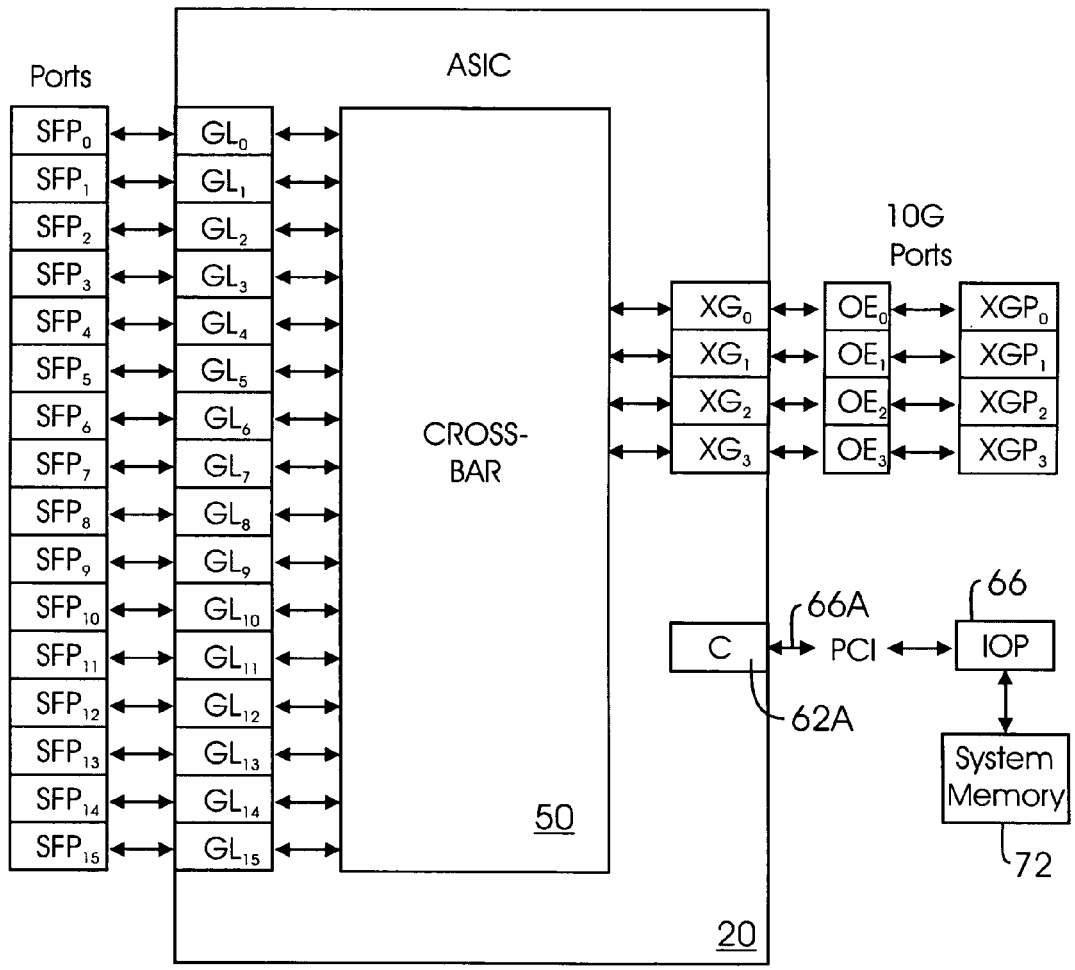
FIG. 1D shows a block diagram of a Fibre
Figure 1F:
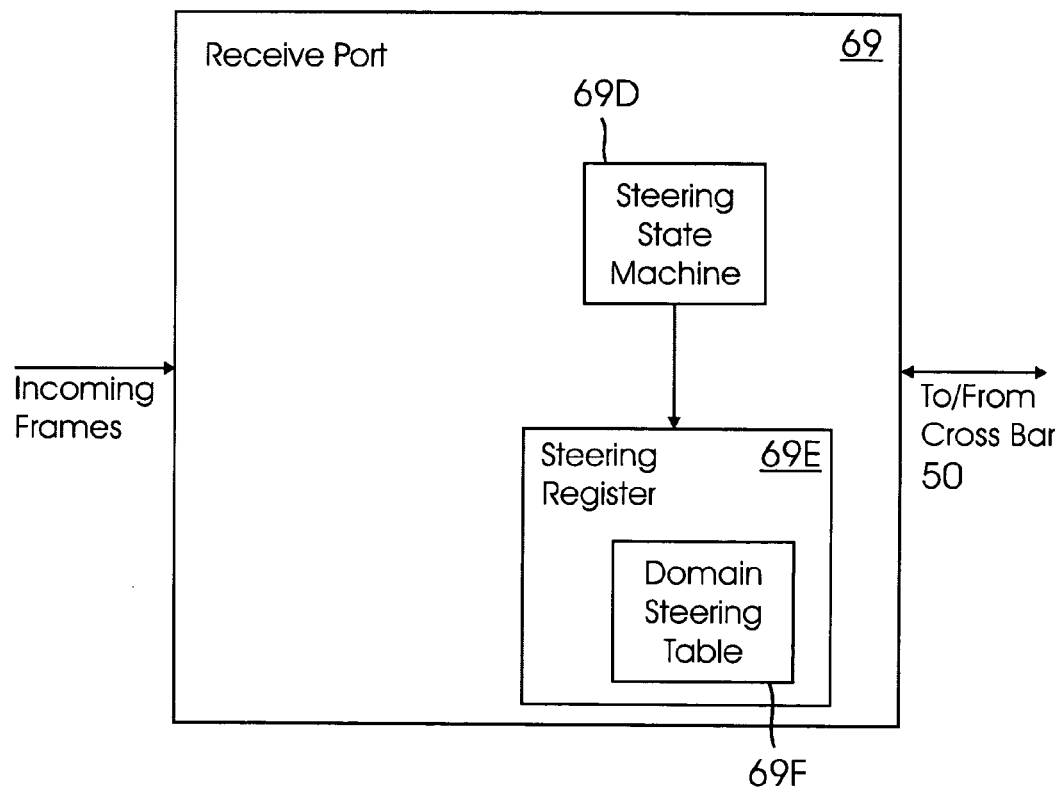
Figure 2E:
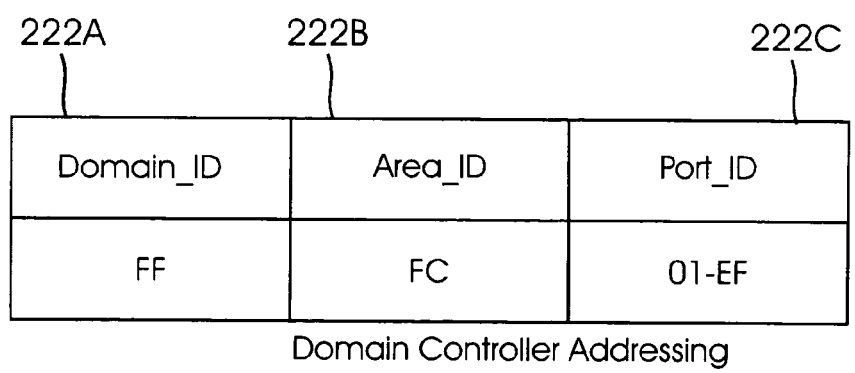
Figure 1G:
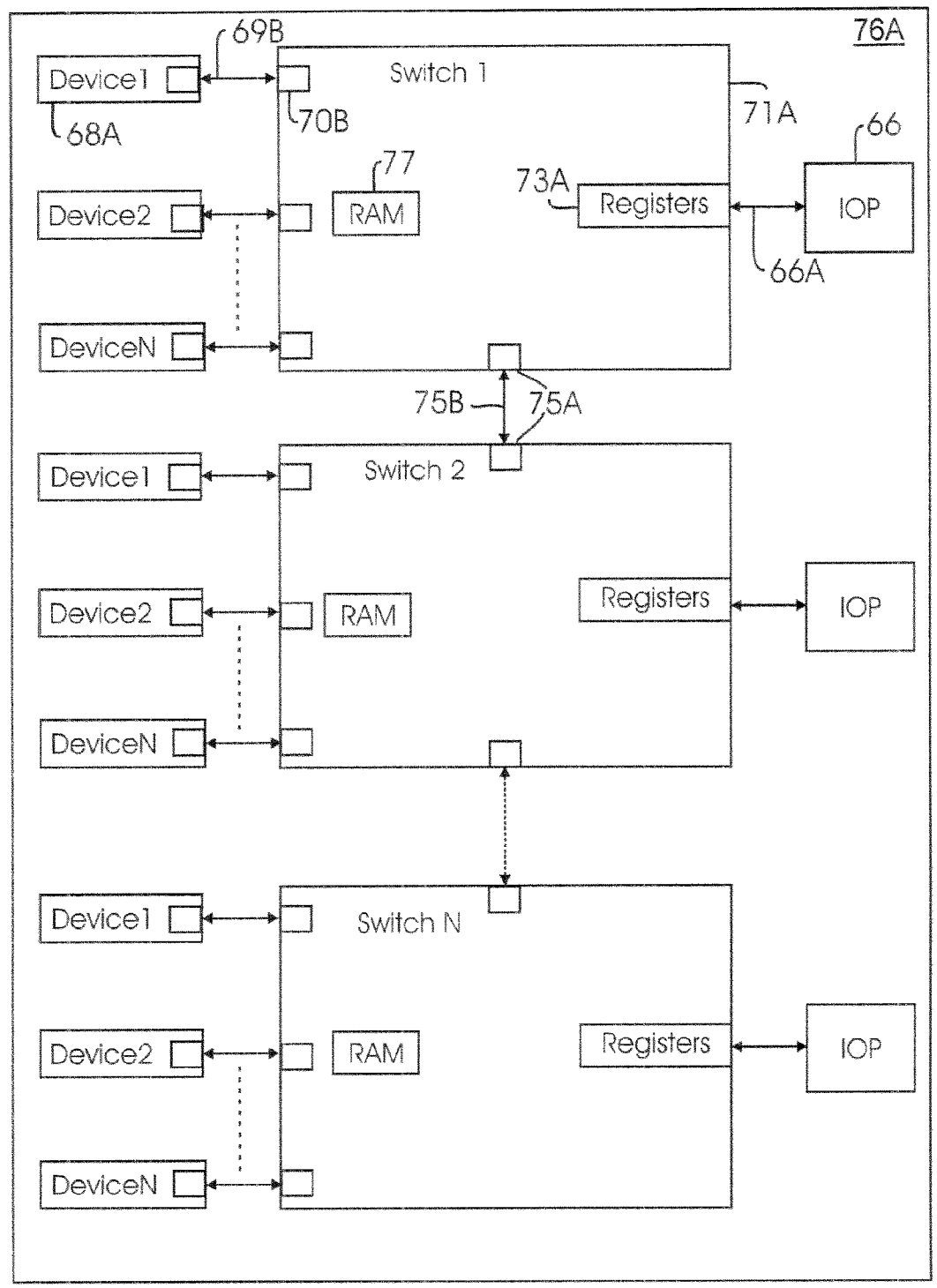
Figure 1H:
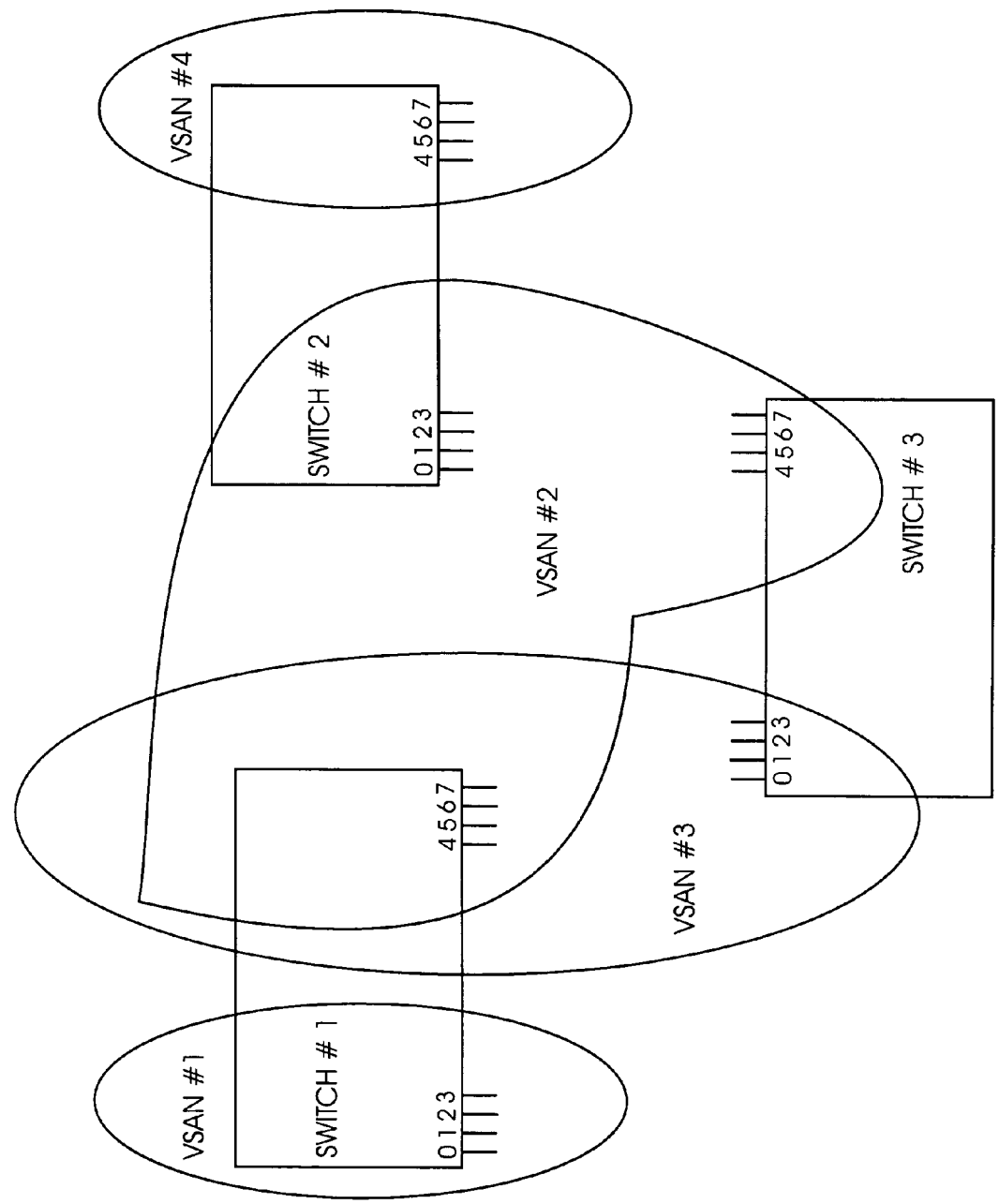
Figure 11:
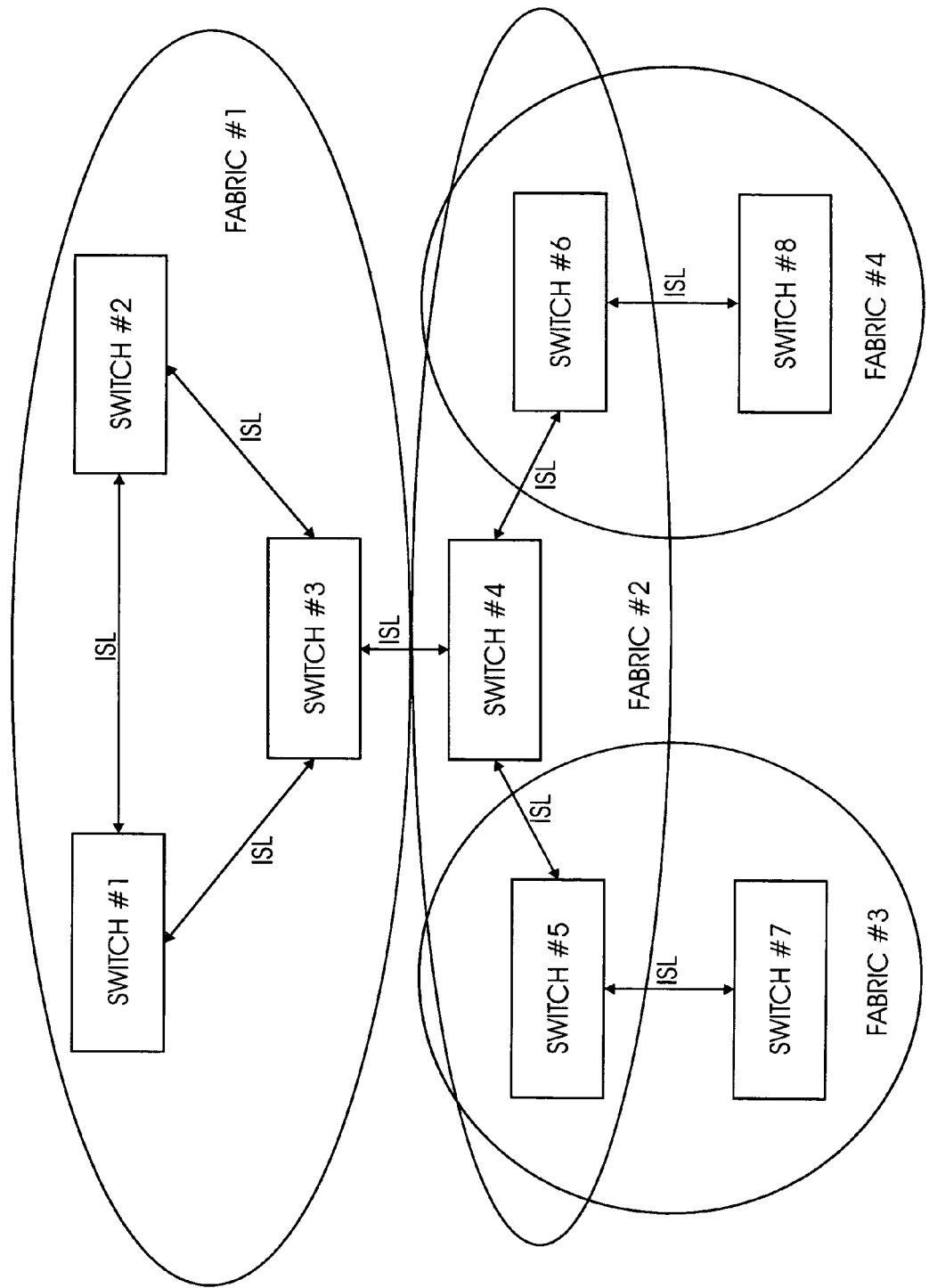
Figure 2A:
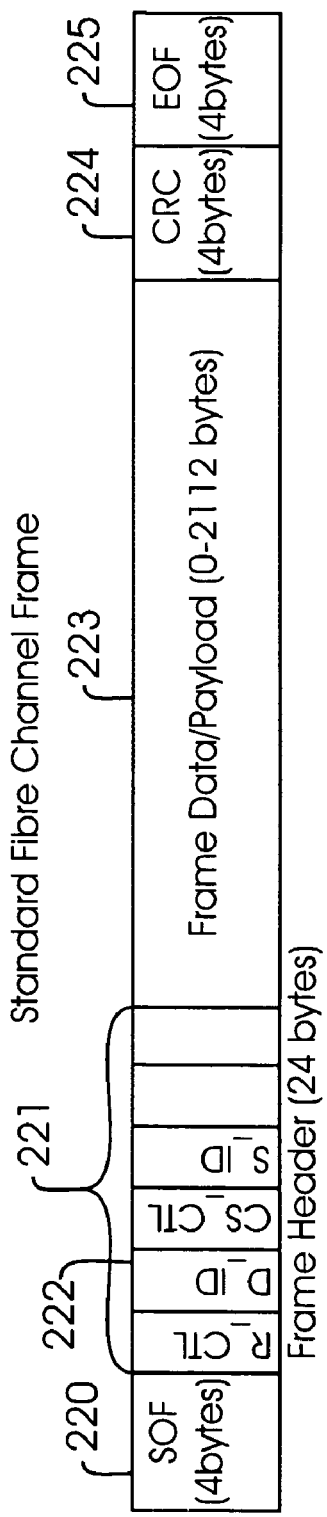
Figure 2B:
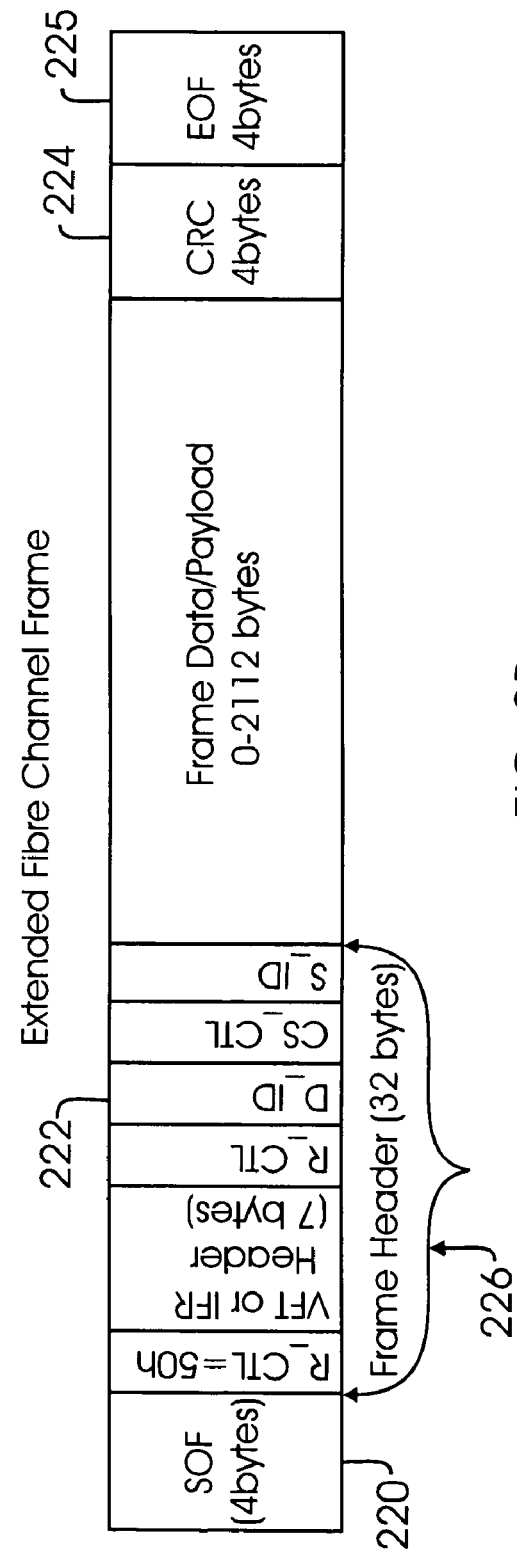
Figure 2C:
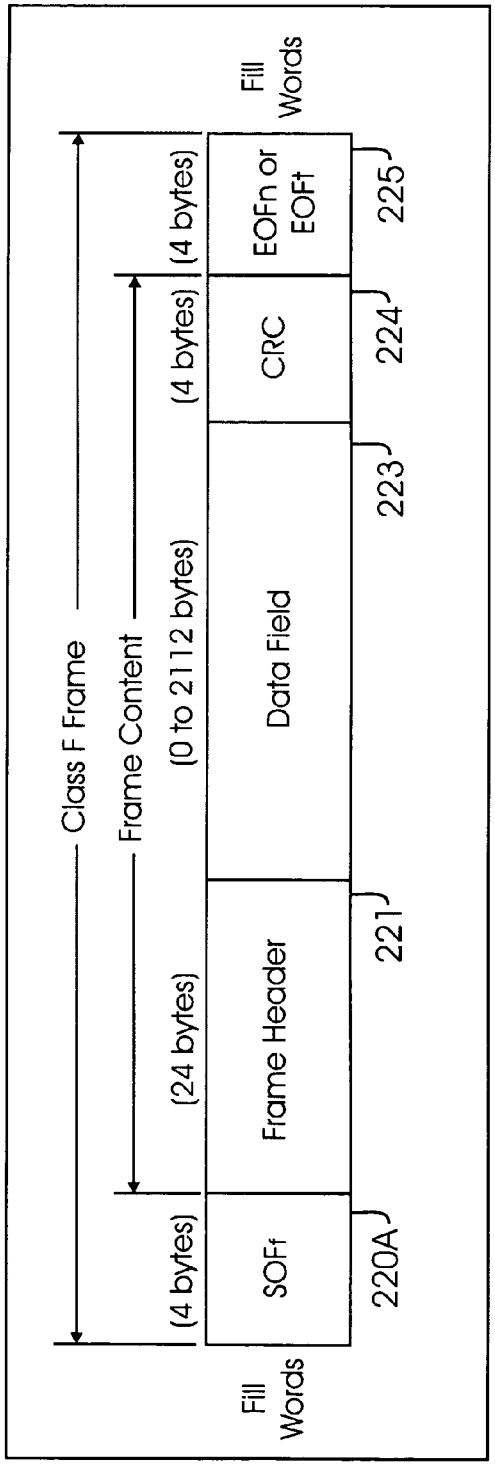
Figure 2D:
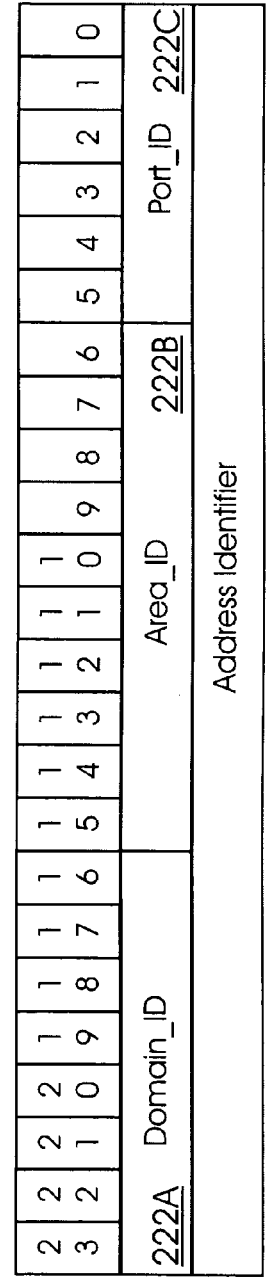
Figure 2F:
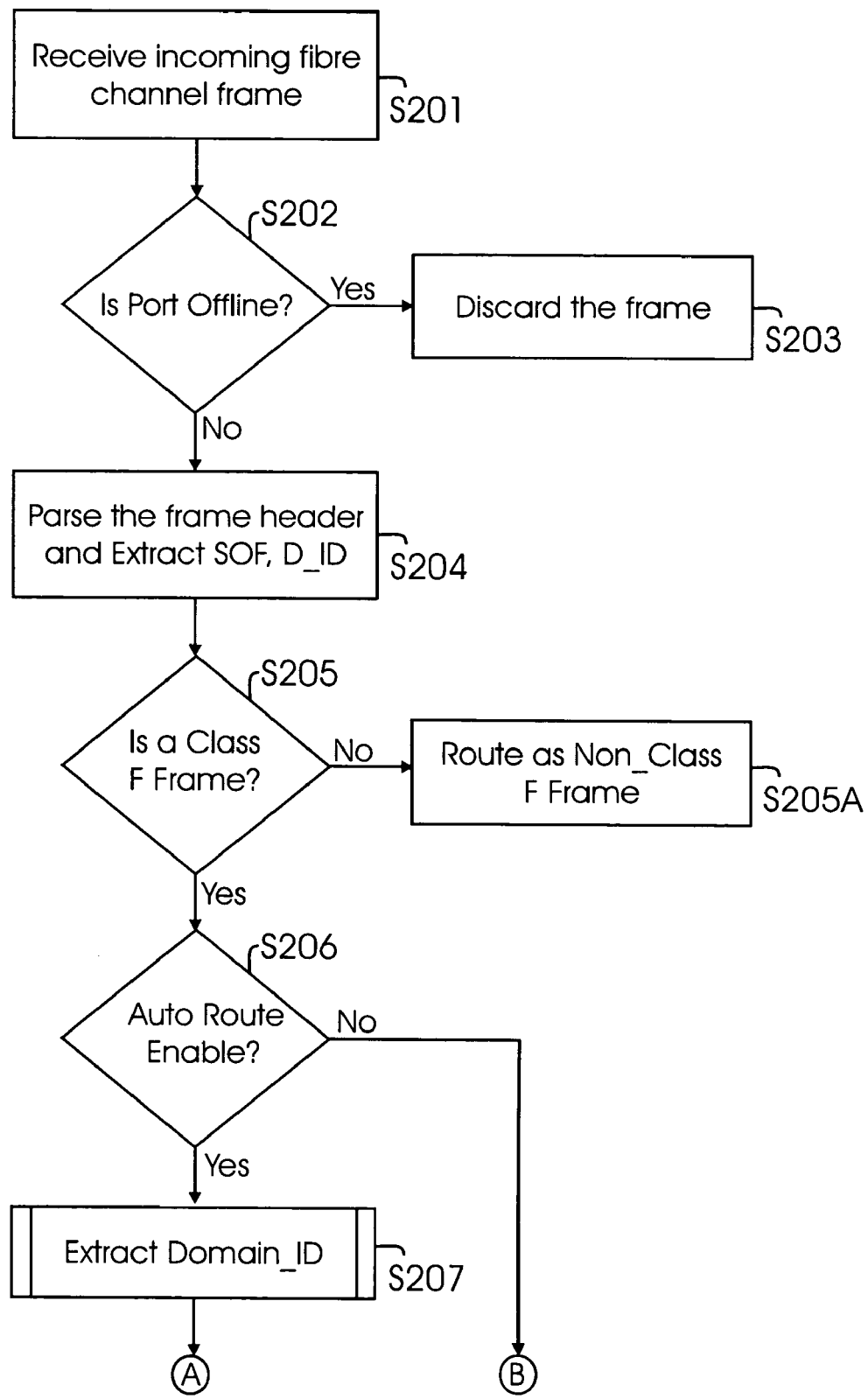

Channel switch element with sixteen GL_Ports and four 10G ports, according to one aspect of the present invention;

FIG. 1E [1E(*i*)-1E(*ii*)] shows a block diagram of a switch element that can auto route a Class F frame addressed to a Domain Controller;

FIG. 1F shows a block diagram of a receive port with a Domain Steering Table, according to one aspect of the present invention;

FIG. 1G shows a block diagram of a Fibre Channel Fabric, according to one aspect of the present invention;

FIG. 1H shows a block diagram with plural Virtual Fabrics (VSANs);

FIG. 1I shows a block diagram with Inter-Fabric connections;

FIG. 2A shows a standard Fibre Channel Frame;

FIG. 2*b* shows a frame with an extended header;

FIG. 2C shows a standard Class F frame;

FIG. 2D shows a block diagram with various components of a D_ID;

FIG. 2E shows an example of Domain Controller Addressing values;

FIG. 2F (2F(*i*)-2F(*ii*)) shows a top-level flow chart for routing Class F frames in a Fibre Channel Fabric, according to one aspect of the present invention; and FIG. 3 shows a Domain Steering Table that maintains Domain_ID information in a Fibre Channel Switch, according to one aspect of the present invention.

DETAILED DESCRIPTION OF THE PREFERRED EMBODIMENTS

Definitions

The following definitions are provided for convenience as they are typically (but not exclusively) used in the Fibre Channel environment, implementing the various adaptive aspects of the present invention.

"Class F Frames": Class F frames are special class of frames that are defined by Fibre Channel standards and start with the SOFf primitive defined below.

"D_ID": A 24-bit Fibre Channel header field that contains the destination address for a frame.

"Domain_ID": A 8-bit field contained in the D_ID of a frame header. This is a unique value assigned to each switch element using a mechanism described in the Fibre Channel Standard "FC-SW-3", incorporated herein by reference in its entirety.

"E_Port": An expansion port that is used to connect Fibre Channel Switch elements in a Fabric.

"F_Port": A Fabric port to which non-loop N_Ports are attached to a fabric and does not include FL_ports.

"Fibre Channel ANSI Standard" ("FC-FS-2"): The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"Inter Fabric Header": The Inter Fabric Routing Extended Header (IFR_Header) is used for routing Fibre Channel frames from one fabric to another. It provides the fabric identifier of the destination fabric, the fabric identifier of the source fabric and information to determine hop count.

"N_Port": A direct fabric attached port, for example, a disk drive or a HBA.

"NL_Port": A L_Port that can perform the function of a N_Port.

"Switch": A fabric element conforming to the Fibre Channel Switch standards.

"Native_ID": This is the Domain_ID of a local switch element.

"SOF": Start_of_Frame (SOF) delimiter that is transmitted as the first Data Word during the transmission of a Fibre Channel frame.

"SOFf": A SOF delimiter that is used to identify a Fibre Channel Class F frame. SOFf delimiter precedes the frame content of all Class F frames.

"Virtual Fabric" As defined by FC-FS-2, Fibre Channel standard, incorporated herein by reference in its entirety, is a Fabric composed of partitions and N_ports having the properties of a single Fabric management domain and Generic Services; and independent from other Virtual Fabrics (e.g. an independent address space).

"Virtual Fabric Identifier" ("VF_ID"): A value that uniquely identifies a Virtual Fabric among plural Virtual Fabrics that share a set of Switches and N_ports.

"Virtual Fabric Tagging Header ("VFT_Header")

An Extended Header that contains information to associate a frame to a specific Virtual Fabric.

In one aspect of the present invention, a sub-set of Class F frames that are addressed to a Domain Controller is automatically routed.

To facilitate an understanding of the preferred embodiment, the general architecture and operation of a Fibre channel System and a Fibre Channel switch element will be described. The specific architecture and operation of the preferred embodiment will then be described with reference to the general architecture.

Fibre Channel System:

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports). The devices of FIG. 1A are operationally coupled via "links" or "paths". A path may be established between two N_ports, e.g. between server 103 and storage 104. A packet-switched path may be established using multiple links, e.g. an N_Port in server 103 may establish a path with disk array 105 through switch 102.

Fibre Channel Switch Element:

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) service and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 is comprised of transmit and receive connections to switch crossbar 50. Within each port, one connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

In the preferred embodiments of switch chassis described herein, the fabric controller is a firmware-programmed microprocessor, also referred to as the input/output processor ("IOP"). As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. IOP 66 in FIG. 1C is shown as a part of a switch chassis utilizing one or more of ASIC 20. S2 will also include other elements, for example, a power supply (not shown). The 20 GL_Ports correspond to channels C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

It is noteworthy that IOP 66 of a switch element in Fabric can operate as a Domain Controller for a Domain. Hence, the terms IOP 66 and Domain Controller throughout this specification have been used inter-changeably.

FIGS. 1E(i)/1E(ii) (jointly referred to as FIG. 1E) show yet another block diagram of ASIC 20 with sixteen GL and four XG port control modules. Each GL port control module has a Receive port (RPORT) 69 with a receive buffer (RBUF) 69A (similar to 58, FIG. 1B) and a transmit port 70 with a transmit buffer (TBUF) 70A (similar to 56, FIG. 1B). GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF 74 and TPORT 74A similar to TBUF 70A and TPORT 70. Protocol module 73 interfaces with SERDES to handle protocol based functionality.

Incoming frames are received by RPORT 69 via SERDES 68 and then transmitted using TPORT 70. Buffers 69A and 70A are used to stage frames in the receive and the transmit path.

FIG. 1F shows a top-level block diagram for a RPORT 69 that includes a steering state machine 69D and steering registers 69E for routing frames. In one aspect steering registers 69E store Domain Steering Table 69F that is used to automatically route Class F frames that are destined for a Domain Controller, as described below with respect to the process flow diagram. It is noteworthy separate steering tables are not required to route normal Fibre Channel frames and the Class F frames destined for a Domain Controller.

Fibre Channel Fabric:

FIG. 1G shows a block diagram of a Fibre Channel Fabric 76A, according to one aspect of the present invention.

Plural networking switches are interconnected through E_PORTS 75A and through an Inter Switch Link (ISL) 75B between the E_Ports 75A. Networking switch 71A includes multiple I/O ports 70B and is coupled to IOP 66 though PCI bus 66A. Input/output ports 70B include RPORT 69 and TPORT 70, described above with respect to FIG. 1E. Although a PCI bus is used in the preferred embodiment of the present invention, any general-purpose bus can be used for transferring data between IOP 66 and I/O ports 70B. Plural devices 68A are connected to I/O ports 70B through a physical link 69B. The physical link can be a copper or an optical link.

Register(s) 73A stores a copy of the Domain Steering Table 69F, which maintains information regarding Domain_IDs. It is noteworthy that register(s) 73A can be a part of the control register 62.

Random Access Memory 77 maintains an image of the firmware that is used by IOP 66 to control and operate switch 71A. IOP 66 when operating as a Domain Controller processes Fibre Channel frames that are received by a switch and destined to the same local switch.

FIG. 1H shows a top-level block diagram for Virtual Fabrics (VSANs), which use the extended headers, according to one aspect of the present invention. FIG. 1H shows three Fabric switches, 1, 2 and 3. Each switch has 8-ports labeled 0-7. It is noteworthy that the present invention is not limited to any particular number/type of ports.

VSAN #1 is the first Virtual Fabric that includes ports 0-3 for Switch #1. VSAN #2 includes Switch #1, ports 4-7; Switch ports 0-3; and Switch #3, ports 4-7. VSAN #3 includes Switch #1, ports 4-7 and Switch #3, ports 0-3. VSAN #4 includes Switch #2, ports 4-7.

FIG. 1I shows an example of Inter-Fabric connections where an extended frame header is used and processed, according to one aspect of the present invention. Eight Fabric switch are shown (numbered 1 through 8) to illustrate Inter-Fabric routing. Switch # 1 is coupled to Switch # 2, while Switch # 3 is coupled to Switch # 1 and 2. Fabric 1 includes Switch #1, 2, and 3.

Fabric 2 includes Switch 4, 5 and 6. Fabric 3 includes Switch 5 and Switch 7, while Fabric 4 includes Switch 6 and Switch 8. The extended headers are used to route frames between the plural Fabrics, for example, between Fabric 1 and Fabric 4. It is noteworthy that the present invention is not limited to any particular number of Fabrics or switches.

Frame Structure:

FIG. 2A shows the structure of a standard Fibre Channel frame that is received and processed by RPORT 69. The Fibre Channel standard, FC-FS-2 (incorporated herein by reference in its entirety) describes the frame structure and fields in detail.

The frame includes SOF (4 bytes) 220 followed by a frame header (24 bytes) 221. CRC 224, which is 4 bytes long, follows the payload 223. CRC 224 is used to check frame data integrity. EOF 225, which is 4 bytes long, follows CRC 224 and indicates the end of a frame.

When SOF 220 is equal to SOFf (shown as 220A in FIG. 2C), then the frame is a Class F frame. FIG. 2C shows the components of a typical Class F frame.

The frame header includes various fields, R_CTL, D_ID 222, CS_CTL, S_ID and others. CS_CTL provides class specific control/priority, while D_ID and S_ID are address identifiers. R_CTL is a 1 byte field that contains routing bits and information bits to categorize a frame function. For example, R_CTL with a value of 50 h (or 51 h) indicates an extended Fibre Channel Frame (shown in FIG. 2B).

The extended Fibre Channel frame has an extended frame header 226. The extended frame header 226 has a VFT_Header that identifies Virtual Fabric or an IFR_Header for Inter-Fabric routing.

Fibre channel switch addressing is defined by Fibre Channel standards. Typically, a 24-bit identifier (D_ID for destination address shown in FIG. 2D) is used to uniquely identify a switch. The 24 bit address includes a 8-bit Domain Identification ("Domain_ID") number (shown as 222A FIG. 2D); 8-bit Area Identifier (Area_ID) (shown as 222B, FIG. 2D) and 8-bit Port identifier (Port_ID) (shown, as 222C, FIG. 2D).

Domain_ID 222A identifies a domain of one or more switches that have the same Domain_ID for all N_Ports and NL_Ports (an N_Port that can perform an Arbitrated Loop function). A domain in the Fibre Channel environment as defined by ANSI Standard X3.289-199X Fibre Channel-Fabric Generic Requirements (FC-FG), incorporated herein by reference in its entirety, is the highest or most significant hierarchical level in a three-level addressing scheme. If there is more than one switch in a Domain, then each switch within the domain is directly connected via an inter-switch link ("ISL") to at least another switch in the domain.

FIG. 2E shows the addressing scheme for a Class F frame that is destined to a Domain controller. It is noteworthy that the Area_ID value for such a frame is "FC". Frames with this addressing scheme are auto-routed, according to the adaptive aspects of the present invention.

Process Flow:

FIG. 2F shows a top-level flow chart for auto-routing Class F frames destined to a Domain Controller in a Fibre Channel Fabric, according to one aspect of the present invention.

Turning in detail to FIG. 2F, in step S201, receive port 69 receives a Fibre Channel frame. In step S202, if the receive port 69 is offline, the frame is discarded.

In step S204, receive port 69 parses the frame, if it is not offline. The D_ID value is extracted from the frame header and SOF type is examined for determining the frame type.

In step S205, if the SOF type matches SOFf (220A, FIG. 2C), then the received Fibre Channel frame is determined to be a Fibre Channel Class F frame. If the SOF type does not match SOFf, then in step S205A the frame is routed as a standard Fibre Channel non-Class F frame.

In step S206, receive port 69 examines control port register 62 to determine if the auto route feature to route the Class F frames destined to a Domain Controller is enabled. The term auto route as used herein refers to routing Fibre Channel Class F frames automatically by hardware with minimum intervention by IOP 66, according to one aspect of the present invention. The auto route ability can be enabled by setting a particular bit value in control register 62. IOP 66 can enable or disable the auto route feature. If the auto route feature is not enabled, then in step S212, the Class F frame is processed and routed by IOP 66.

If the auto route feature is enabled in step S206, then in step S207 the Domain_ID value is extracted from the frame D_ID.

In step S207A, the destination of the frame is determined by comparing the upper 16 bits of the D_ID value. If the upper 16 bits of the D_ID match hexadecimal value 0xFFFC then the Class F frame is destined to a Domain Controller. The lower 8 bits of the D_ID value are used as the Domain_ID value of the frame. This special Domain_ID value is used to route the frame automatically, according to one aspect of the present invention. The process then moves to step S208, as described below.

If the upper 16 bits of the D_ID does not match hexadecimal value 0xFFFC then the Fibre Channel Class F frame is forwarded to IOP 66 for processing(step S212). In step S208, the Domain_ID value is compared to the Native_ID of the switch element. Each Nx-Port has a native N_Port_ID that is unique within the address domain of a Fabric. It is noteworthy that each switch may have a different Native_ID for each Virtual Fabric of which the switch is a member. If the Domain_ID value is equal to Domain_ID (Native_ID) value of the switch, then the frame is destined to the local switch. In step S209, the frame is sent to IOP 66, which operates as a local Domain Controller for further processing.

It is noteworthy that each Fibre Channel switch in a Fibre Channel fabric has a unique Domain_ID value that is assigned during the initialization process of the Fibre Channel Fabric as described in the Fibre Channel specification "FC-SW-3", available at via the Internet from the website located at t11.org.

If the Domain_ID value is not equal to the Native_ID of the switch in step S208, then in step S210, the extracted Domain_ID is compared with the Domain_ID values stored in Domain Steering Table 69F stored in steering registers 69E. Output port and validity of the route is determined from the fields corresponding to the Domain_ID value.

In step S211, if a match is found and if the route is valid corresponding to the extracted Domain_ID value, then the frame is routed to the output port in step S213, otherwise the frame is sent to IOP 66 (in step S212).

Domain Steering Table:

FIG. 3 shows an example of a Domain Steering Table 69F, which maintains information regarding Domain_ID. Domain Steering Table 69F is maintained in Random Access Memory 77 (at the switch level) and in steering registers 69E (at the port level), which is accessible by IOP 66/RPORT 69. Each entry in Domain Steering Table has a Domain_ID value and the associated route information.

Domain Steering Table 69F is comprised of a column 300 that includes the Domain_ID value, a column 301 that has the corresponding output port information and a column 302 that indicates if the route is valid.

It is noteworthy that using Domain_ID values as the table address may imply Column 300, i.e., the adaptive aspects of the present invention are not limited to an actual physical table.

The entries in column 302 are a "yes" if the associated route is valid and a "no" if the associated route is not valid. Firmware modifies entries in the column during the initialization of the port/switch.

It is noteworthy that Columns 301 and/or 302 can be repeated to allow re-assignment of Domain_ID for Virtual Fabrics or unique Fabrics. In other words, each virtual Fabric would be assigned a different Column 301 and optionally a different Column 302.

It is also noteworthy that the same steering tables/registers can be used for normal frame steering and for Domain Controller frame steering. This means that a single steering table can be used for routing frames. The same tables/registers are used but the table index is extracted or parsed from a different part of the frame. For example, for a non Class F frame, the upper 8 bits of the D_ID are used to extract the Domain_ID, while for a Class F frame; the lower 8 bits are used to extract the Domain_ID.

It is noteworthy that Domain_ID values can be stored in any format in Random Access Memory 77 and the term "table" is not to be construed as a limitation.

Although the present invention has been described with reference to specific embodiments, these embodiments are illustrative only and not limiting. Many other applications and embodiments of the present invention will be apparent in light of this disclosure and the following claims.

What is claimed is:

1. A Fibre Channel switch element for routing Fibre Channel frames, comprising:
    a plurality of ports for receiving and transmitting Fibre Channel frames, wherein each port includes:
    a receive segment for receiving a Fibre Channel frame;
    a transmit segment for transmitting the Fibre channel Frame;
    wherein the receive segment is configured to: (a) parse the received Fibre Channel frame by extracting a start of frame (SOF) value from a frame header for the Fibre Channel frame; (b) determine if the received Fibre Channel frame is a Class F frame by matching the SOF value extracted from the received frame header with a start of frame delimiter of a class F Fibre Channel frame; and (c) if the received Fibre Channel frame is a Class F frame and if automatic routing of a Class F frame is enabled for the port that received the Class F Frame, then automatically route the Class F frame to a Domain Controller, if the Class F frame is addressed to the Domain Controller;
    wherein if the Fibre Channel frame is a Class F frame, as determined in step (c) and not destined for the Domain Controller, then the Fibre Channel frame is not sent to the Domain Controller; and
    wherein if automatic routing is disabled for the port and the Fibre Channel frame is a Class F frame, then the Class F frame is processed by a processor for the Fibre Channel switch element.

2. The Fibre Channel switch element of claim 1, wherein if a Fibre Channel Class F frame Domain_ID value extracted from a Fibre Channel D_ID value matches a Native_ID value for the Fibre Channel switch element, then the Fibre Channel Class F frame is routed to the processor of the Fibre Channel switch element that operates as a Domain Controller.

3. The Fibre Channel switch element of claim 1, wherein lower 8 bits of the frame D_ID value are used for routing the Class F frame to the Domain Controller.

4. The Fibre Channel switch element of claim 1, wherein automatic Class F frame routing is enabled by setting a bit in a control register accessible by the processor for the Fibre Channel switch element, and when the bit is set, Fibre Channel Class F frames are automatically routed without intervention from the processor.

5. The Fibre Channel switch element of claim 1, wherein a Domain Steering, Table is used for steering Class F frames addressed to the Domain Controller and for steering non-Class F frames.

6. The Fibre Channel switch element of claim 5, wherein the Domain Steering Table stores different columns of output port number values and a control register stores plural Native Identification values for a Fibre Channel switch element that operates in more than one Virtual Fabric.

7. The Fibre Channel switch element of claim 5, wherein the Domain Steering Table is stored in a register at the Fibre Channel switch element port.

8. A method for routing Fibre Channel frames using a Fibre Channel switch element having a plurality of ports, each port having a receive segment for receiving a fibre channel frame, and a transmit segment for transmitting the fibre channel frame, comprising:
    (a) receiving a Fibre Channel frame at a receive segment of a port from among the plurality of ports at the Fibre Channel switch element;
    b) parsing the Fibre Channel frame at the receive segment and extracting a start of frame (SOF) value from a frame header for the Fibre Channel frame;
    (c) determining if the received Fibre Channel frame is a Class F frame by matching the SOF value extracted from the received frame header with a start of frame delimiter of a class F Fibre Channel frame;
    (d) if the received Fibre Channel frame is a Class F frame, as determined in step (c) and if automatic routing of a Class F frame is enabled for the port that received the Class F Frame, then automatically routing the Class F frame to a Domain Controller, if the Class F frame is addressed to the Domain Controller;
    (e) if the Fibre Channel frame is a Class F frame as determined in step (c) and not destined for the Domain Controller, then the Class F frame is not sent to the Domain Controller; and
    (f) if automatic routing is disabled for the port and the Fibre Channel frame is a Class F frame as determined in step (c), then the received Class F frame is processed by a processor for the Fibre Channel switch element.

9. The method of claim 8, wherein parsing the Fibre Channel frame includes extracting a destination identifier field (D_ID) value from the frame header; and if a Fibre Channel Class F frame Domain_ID value extracted from the D_ID value matches a Native_ID value for the Fibre Channel switch element, then the Fibre Channel Class F frame is routed to the processor for the Fibre Channel switch element that operates as a Domain Controller.

10. The method of claim 9, wherein lower 8 bits of the frame D_ID value are used for routing the Class F frame to the Domain Controller.

11. The method of claim 8, wherein automatic Class F frame routing is enabled by setting a bit in a control register accessible by the processor for the Fibre Channel switch element, and when the bit is set, Fibre Channel Class F frames are automatically routed without any intervention from the processor.

12. The method of claim 8, wherein a Domain Steering Table is used for automatically steering both Class F frames addressed to the Domain Controller and non-Class F Fibre Channel frames.

* * * * *

UNITED STATES PATENT AND TRADEMARK OFFICE
CERTIFICATE OF CORRECTION

PATENT NO. : 7,525,968 B1  Page 1 of 1
APPLICATION NO. : 11/376955
DATED : April 28, 2009
INVENTOR(S) : Frank R. Dropps et al.

It is certified that error appears in the above-identified patent and that said Letters Patent is hereby corrected as shown below:

In column 6, line 46, delete "Switch" and insert -- Switch #2, --, therefor.

In column 7, line 18, delete "identifies" and insert -- identifies a --, therefor.

In column 10, line 2, in Claim 5, delete "Steering, Table" and insert -- Steering Table --, therefor.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,525,968 B1
APPLICATION NO. : 11/376955
DATED : April 28, 2009
INVENTOR(S) : Frank R. Dropps et al.

It is certified that error appears in the above-identified patent and that said Letters Patent is hereby corrected as shown below:

On the Title Page, Item (75), under "Inventors", delete "Brel E. Indrelee" and insert
-- Bret E. Indrelee --, therefor.

Signed and Sealed this
Twentieth Day of August, 2013

Teresa Stanek Rea
*Acting Director of the United States Patent and Trademark Office*